United States Patent [19]

Marchand et al.

[11] Patent Number: 5,322,642
[45] Date of Patent: Jun. 21, 1994

[54] METHOD OF MANUFACTURING SEMICONDUCTORS FROM HOMOGENEOUS METAL OXIDE POWDER

[75] Inventors: Alain R. Marchand, Vénissieux; Olivier Bucher, Mélisey; Henri Delalu, Lyons; Gérard Marichy, Sainte Foy les Lyon; Jean-Jacques Counioux, Lyons, all of France

[73] Assignee: Ferraz, Lyons, France

[21] Appl. No.: 920,857

[22] Filed: Jul. 28, 1992

[51] Int. Cl.$^5$ .............................................. H01B 1/06
[52] U.S. Cl. .................................................... 252/518
[58] Field of Search ................. 252/518, 519; 505/1, 505/785, 780, 733; 338/21

[56] References Cited

U.S. PATENT DOCUMENTS

| | | | |
|---|---|---|---|
| 3,953,371 | 4/1976 | May | 252/518 |
| 4,559,200 | 12/1985 | Yamasaki | 420/492 |
| 4,960,752 | 10/1990 | Ashok et al. | 505/1 |
| 5,136,609 | 8/1992 | Yamaguchi et al. | 373/18 |
| 5,189,009 | 2/1993 | Yurek et al. | 505/1 |
| 5,189,010 | 2/1993 | Strom et al. | 505/1 |
| 5,248,452 | 9/1993 | Imai et al. | 338/21 |

*Primary Examiner*—Mark L. Bell
*Assistant Examiner*—A. Wright
*Attorney, Agent, or Firm*—Dowell & Dowell

[57] ABSTRACT

A method of manufacturing metal alloys to obtain a homogeneous powder made up of oxides of the metals and applications thereof to the manufacture of semiconductors and superconductors comprises, after placing the various metals selected in a crucible, melting the metals in a neutral or reducing atmosphere while stirring the liquid to homogenize it, recovering the liquid alloy, spraying the alloy obtained to form homogeneous powder particles of determined particle size, and oxidizing the particles. It applies to the manufacture of zinc oxide-based varistor type semiconductor ceramics and to the manufacture of superconductor products or positive or negative temperature coefficient thermistors.

23 Claims, 4 Drawing Sheets

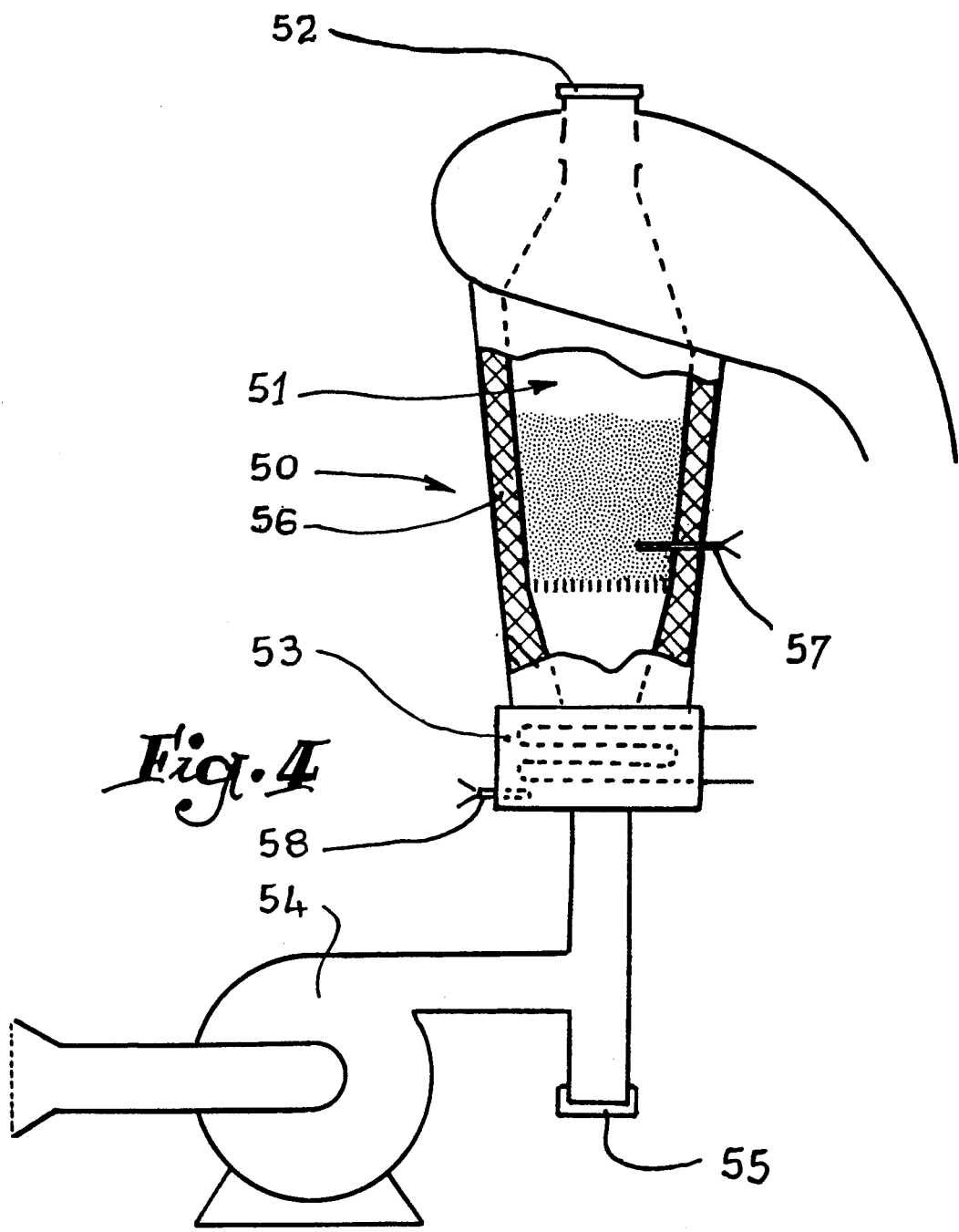

METHOD OF MANUFACTURING SEMICONDUCTORS FROM HOMOGENEOUS METAL OXIDE POWDER

BACKGROUND OF THE INVENTION

1. Field of the Invention

The present invention concerns a new method of manufacturing metal alloys in order to obtain a homogeneous powder of oxides of the metals. The method is more particularly, although not exclusively, related to the manufacture of pellets by cold pressing or by sintering in order to produce semiconductors or superconductors for the manufacture of lightning arresters or voltage limiter components associated with electrical or electronic equipment, for example.

2. Description of the Prior Art

Known components of this kind are usually produced from a powder or granular material comprising an oxide of zinc alloyed with doping elements in the form of oxides of nickel, chromium, manganese, magnesium, bismuth, antimony, silicon, cobalt, and the like.

Conventional methods of using ceramic materials usually consist of weighing the constituent oxides, mixing and grinding them and then making up a mixture in an aqueous medium to obtain a slip. This slip is then sintered at high temperature after pressing to shape as is standard practice in the ceramics art. The component made in this way can have metal current feed electrodes applied to its ends by depositing a metal layer using plasma torch sputtering or any other deposition method. The remainder of the exterior surface is usually coated with various layers of materials providing electrical insulation, physical-chemical and mechanical protection and possibly preventing electrical arcing. In particular, glasses or ceramics compatible with the oxide, synthetic resins such as epoxy resins, silicone products and most known insulating products are used.

Methods of this kind are complex to implement and require large-scale industrial installations including grinders and furnaces. It is also necessary to carry out complex checks on the raw materials to ensure that the final product is of good and reproducible quality. Also, the homogeneity of the product obtained leaves something to be desired because the ground constituents can never be perfectly mixed together.

The improvements which are the subject matter of the present invention are directed to remedying these drawbacks and to providing a method of manufacture which constitutes a better response than hitherto available to the requirements of the art and which in particular produces a homogeneous powder made up of metal alloy oxides.

In a method in accordance with the invention the basic components from which the powder to be made into the semiconductor is obtained are no longer oxides but alloys or mixtures of metals which are subsequently oxidized in the solid, liquid or vapor phase.

SUMMARY OF THE INVENTION

The present invention is a method of manufacturing metal alloys in order to obtain a homogeneous powder made up of oxides of said metals, comprising:
  placing the various metals selected in a crucible;
  melting the metals in a neutral or reducing atmosphere and stirring the liquid to homogenize it;
  recovering the liquid alloy;
  spraying the alloy to form a powder of particular particle size, each particle of which is homogeneous; and
  oxidizing the particles.

In a first embodiment, the step of melting the metals in a neutral or reducing atmosphere is followed by the following steps:
  pouring the liquid alloy into an ingot mold in the neutral or reducing atmosphere;
  cooling the ingot obtained;
  reducing the ingot to a powder of particular particle size, each particle of which is homogeneous; and
  oxidizing the particles.

The ingot obtained may be reduced to a powder by grinding or to chips by machining so that the ingot, the powder or the chips may be left in an appropriate atmosphere to oxidize them.

The ingot may also be melted to yield a liquid alloy which is sprayed to obtain fine elements or solid grains of homogeneous composition which are then oxidized.

In another embodiment of the method the step of melting the metals in a neutral or reducing atmosphere is followed by the following steps:
  spraying the alloy to form fine droplets using a gas;
  recovering the elements in the form of solid metal grains in the lower part of the sprayer; and
  oxidizing the solid grains in a fluidized bed device.

The powder obtained is compacted into pellets either by cold pressing or by sintering at raised temperature.

A better understanding of the invention, its features and the advantages that it is able to procure will be obtained from the appended drawings which are provided by way of example only.

BRIEF DESCRIPTION OF THE DRAWINGS

FIG. 4 is a view in cross-section of a static aerated fluidized bed reactor.

DETAILED DESCRIPTION OF THE INVENTION

Figure 1:
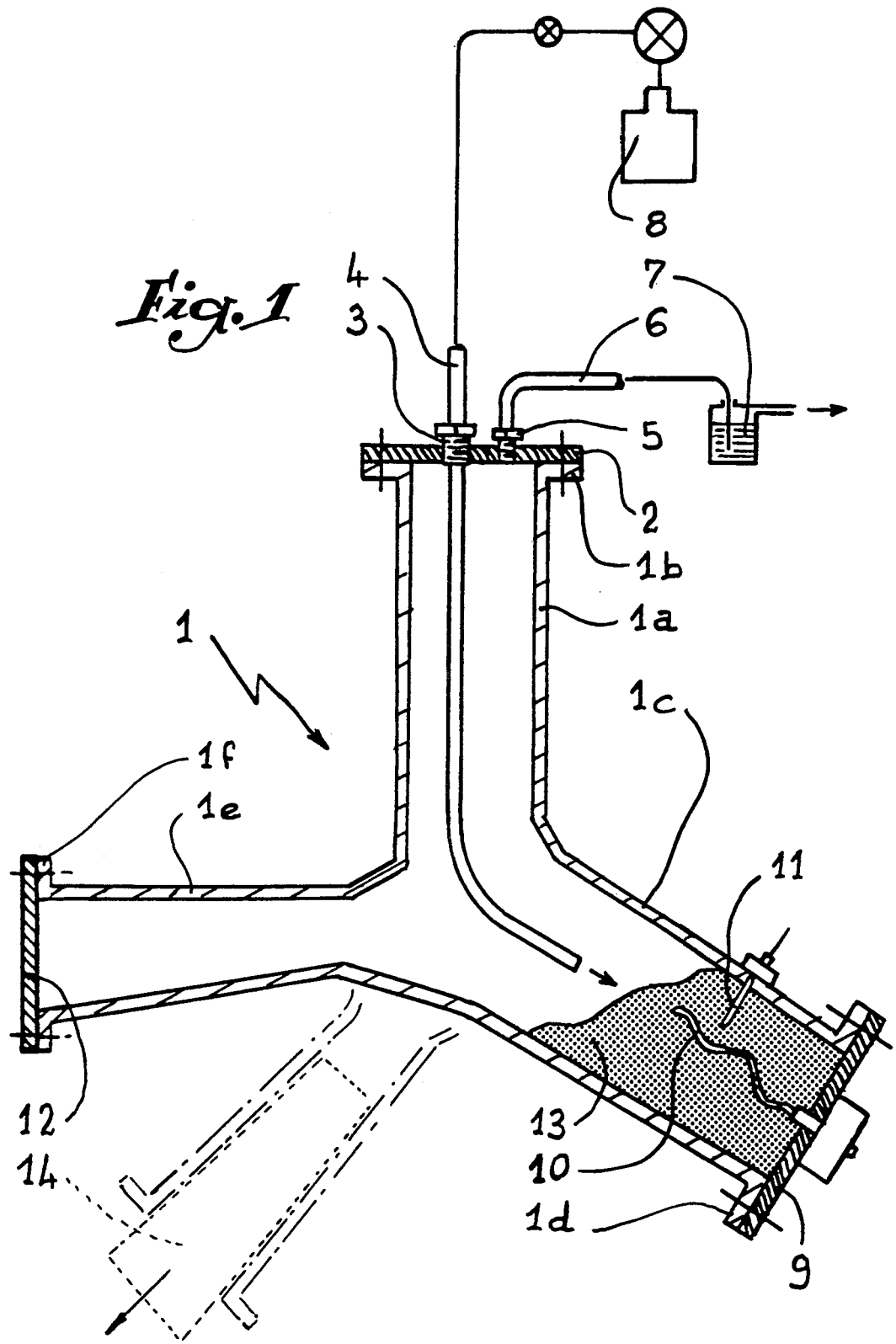
FIG. 1 is a view in cross-section of experimental apparatus designed to implement some phases of a first embodiment of a method in accordance with the invention.

The experimental apparatus shown in FIG. 1 comprises a furnace 1 with three branches made from a refractory material such as stainless steel. The furnace 1 has a vertical first branch 1a the free end of which incorporates a flange 1b to which a first closure member 2 is sealed. A connector 3 passes through this closure member to provide a sealed passage for a pipe 4 feeding hydrogen into the furnace 1.

A second connector 5 passing through the closure member 2 is associated with a pipe 6 leading out to a bubble-through device 7. The inlet end of the pipe 4 is connected to a storage tank 8 containing hydrogen and the interior part of the tube discharges into the second branch 1c of the furnace 1 which is oblique to the branch 1a. The outlet end of the branch 1c incorporates a flange 1d to which a second closure member 9 is hermetically sealed. Note that the closure member 9 is associated with a stirrer 10 shown diagrammatically; a thermo-electric sensor 11 is installed in the branch 1c for reasons to be explained later.

The horizontal third branch 1e of the furnace 1 is frustoconical, widening towards its free end which incorporates a flange 1f to which an end plate 12 is sealed.

The furnace 1 is used to manufacture an ingot by the following method:

The closure member 2 is removed and the various metals to be mixed together at raised temperature to obtain a homogeneous alloy are introduced into the furnace 1. The various metal particles collect in the branch 1c. The closure member 2 is then replaced and the tube 4 and the pipe 6 connected up. The interior part of the tube 4 is angled so that its outlet is at the inlet of the branch 1c.

The branch 1c is then heated to a temperature sufficient to melt the metals that it contains, the melting temperature being regulated by the sensor 11 and apparatus that is not shown.

When the metals have been reduced to a liquid the stirrer 10 is operated to homogenize the mixture. Melting occurs in a reducing atmosphere because hydrogen from the storage tank 8 is blown into the furnace 1 from which it escapes via the pipe 6.

When the molten alloy is at the correct temperature and perfectly homogenized the furnace is tilted counterclockwise until the molten alloy 13 flows into the branch 1e of the furnace 1 which constitutes an ingot mold. Heating of the branch 1c is then stopped so that the liquid alloy in the ingot mold 1e cools and forms an ingot 14. The solidified ingot is removed from the ingot mold after removing the end plate 12, as shown in dashed and chain-dotted outline in FIG. 1.

Note that the pouring of the liquid and the cooling of the ingot take place in a reducing atmosphere because the supply of hydrogen is not discontinued.

The ingot obtained may be placed in an appropriate atmosphere to oxidize it and used as such to manufacture a voltage limiter device such as a lightning arrester. The ingot 14 can instead be ground to a powder or machined to produce chips and the powder grains or chips oxidized and then compacted into pellets by cold pressing or sintering at 1,300° C. for one hour.

In a preferred embodiment the ingot is melted to produce a liquid alloy which is sprayed to obtain fine elements or solid grains of homogeneous composition.

Figure 2:
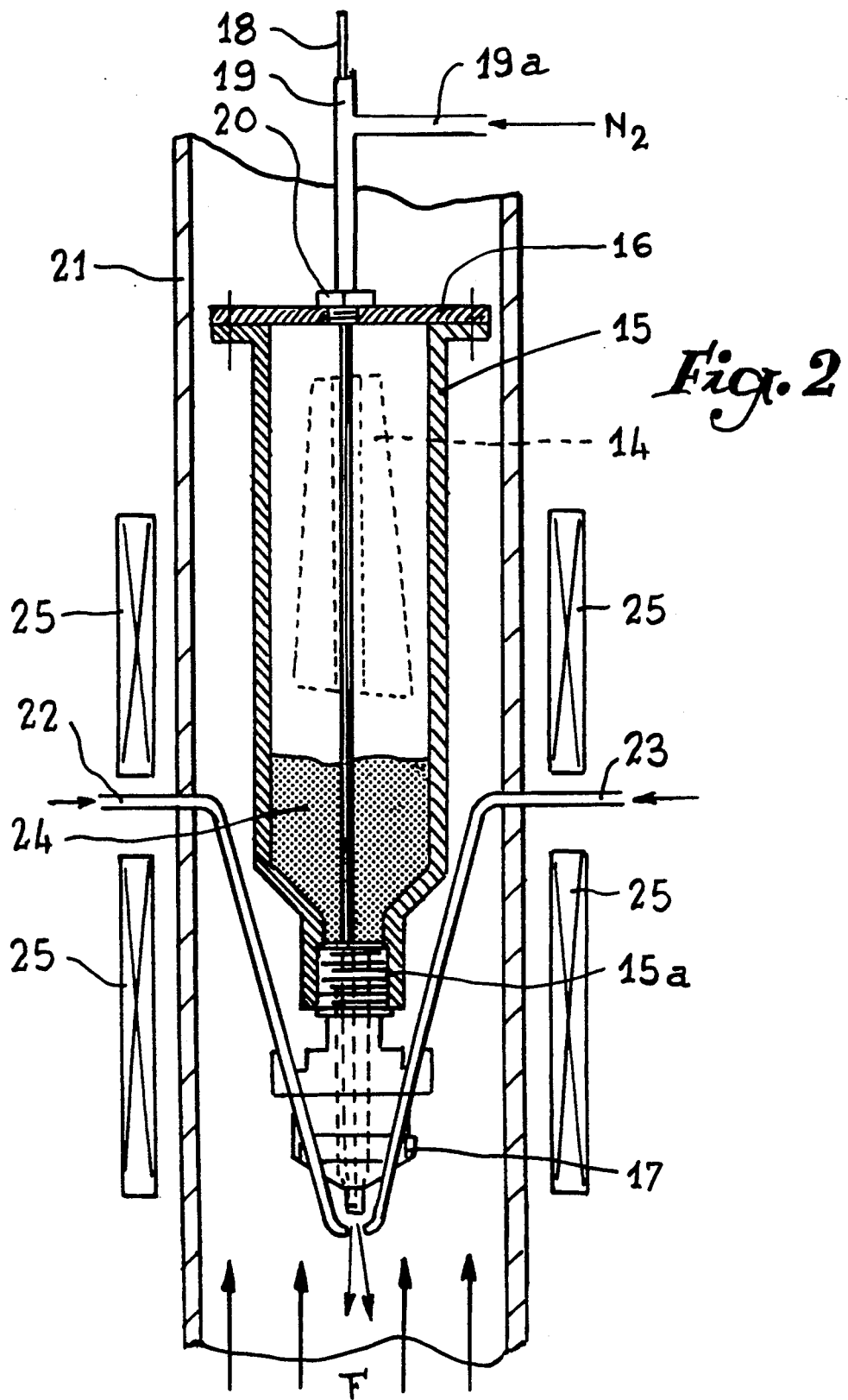
FIG. 2 is a view in cross-section of experimental apparatus designed to carry out the final phases of this first embodiment of a method in accordance with the invention.

The apparatus shown in FIG. 2 is used for this purpose.

This apparatus is a cylindrical furnace 15 whose upper end is hermetically sealed by a closure member 16 and whose lower end has a frustoconical part ending in a screwthreaded opening 15a into which is screwed a nozzle 17 which can be shut off by a needle 18 passing completely through the furnace 15.

Outside the furnace the needle 18 is inside a pipe 19 sealed to the closure member 16 by a connector 20.

A stuffing gland (not shown) is provided between the needle 18 and the pipe 19 which has a branch 19a connected to a storage tank containing pressurized nitrogen.

The furnace 5 is disposed in a coaxial tube 21 in which it is retained by appropriate means (not shown). Two pipes 22, 23 enter the tube 21 and pass obliquely through the nozzle 17, their discharge ends facing the center of the nozzle 17.

Operation is as follows:

The ingot 14 is bored out along its axis and then placed in the furnace 15 after removing the needle 18 and the closure member 16. The latter is replaced and the needle 18 is inserted in the pipe 19 to close off the opening of the nozzle 17 after passing through the ingot 14.

The ingot is heated so that it melts to form a liquid alloy 24. The needle 18 is then removed to open the nozzle 17 and nitrogen is injected into the furnace to pressurize the molten alloy 24 so that it flows dropwise through the opening of the nozzle 17. The pipes 22 and 23 are supplied with hot, optionally moist air or other oxidizing gas so that the droplets of molten alloy 24 are sprayed into fine particles which are simultaneously oxidized and fall to the lower end of the tube 21 by which time they are cold.

The temperature of the oxidizing gas fed through the pipes 22 and 23 is such as to oxidize the sprayed particles.

Naturally, the material from which the tube 21 is made must not be degraded by the effect of the heat. To this end the furnace 15 and the tube 21 may be made from a refractory material such as stainless steel which does not react with the molten alloy.

Oxidation can be accelerated by establishing a counterflow in the tube 21 of hot air F optionally laden with steam or oxygen or any other additive to favor oxidation. The tube 21 can be heated by resistive elements 25 or any other appropriate means to obtain temperatures in the order of 1,000° C. to speed up the formation of the oxidized mixture.

If the molten alloy leaving the nozzle 17 is sprayed by means of a reducing or neutral gas the fine particles or droplets of alloy when cooled remain in the unoxidized metal state. They can be oxidized by leaving them in an oxidizing medium such as a Joule effect furnace or a furnace in which a counterflow of oxidizing agents is established.

Note that spraying occurs at a temperature between 600° and 900° C. If oxidation is effected in the solid phase it can take place between 400° and 900° C. and preferably between 600° and 900° C. to enable the initial reactions between oxides.

The metal alloy droplets can be oxidized at a temperature between 600° and 1,000° C.

In another embodiment to be described in more detail later with reference to FIGS. 3 and 4 the metals selected are placed in a crucible disposed in the upper part of a sprayer device.

The alloy is melted and the liquid is stirred to homogenize it. This operation can be carried out in a Joule effect furnace, for example. The molten alloy can then be mixed mechanically, for example using a stirrer or a vibrator device or a device which moves the crucible.

A high-frequency furnace may instead be used both to melt the alloy and to homogenize it by virtue of the induced electromagnetic field.

These operations are carried out under a neutral or reducing atmosphere, in particular to avoid oxidation of any constituent(s) of the alloy.

If selective oxidation did take place, the products formed would be expelled in the dross, varying the composition of the alloy.

This phenomenon occurs in particular when a small quantity of alloy is prepared. A flow of argon, hydrogen or any other gas that does not promote oxidation can be used to keep the constituents in the metal state.

To prepare a large quantity of alloy it is possible to establish a flow of air through the device, for example by using a molten salt such as sodium chloride or borax as a chemical screen on top of the liquid bath. This is recommended only if the quantity of dross is large.

The melting operation is carried out at a temperature between 400° and 600° C. in the specific case of a metal mixture based on zinc but the temperature may be higher or lower depending on the nature of the constituents of the alloy.

The molten alloy is then sprayed to form fine droplets.

The spraying gas may be a gas that does not promote oxidation, in particular argon or nitrogen. The powder particles obtained are then in the form of the metal.

It is also possible to use other types of gas, in particular reactive gases, in order to convert the droplets of alloy into the carbide, nitride, boride or any other form derived from the metals in the mixture.

To form oxide mixture powders an oxidizing gas such as oxygen or air laden with moisture or any product promoting oxidation of the alloy droplets such as a $CO/CO_2$ mixture is used.

The particles in the form of solid metal grains partially converted into any other form derived from the metal state are recovered in the lower part of the sprayer. They then undergo chemical and heat treatment in a fluidized bed device, such as an oxidation treatment, using air as the fluidizing gas, for example. The device also enables recovery of solid metal grains which do not undergo any chemical treatment within the fluidized bed. The particles are then collected either from the outlet of the sprayer device or after entering the bed if a neutral or reducing gas is used as the fluidizing gas.

Various types of fluidized beds enable fast and total conversion of the starting alloy.

In a first embodiment the bed may be of the static type. The alloy powder is then held in suspension using a gas which reacts with the alloy. Hot air may be used, for example, or any other gas promoting oxidation of the alloy particles introduced into the fluidized bed.

The powder is not extracted from the bed until the treatment is completed.

The entire device is heated to a temperature which enables rapid conversion of the particles. The choice of this temperature is motivated by the following considerations:

- the constituent elements must be thermodynamically oxidizable at this temperature;
- it is essential to keep the particles in granular form, preventing any caking of the powder;
- deterioration of the materials constituting the bed must be avoided;
- the homogeneity of the material must be preserved; in particular, if air is used to oxidize a zinc-based alloy, the temperature of the reactive gas must be between 400° and 700° C.

Above 400° C. the rate of oxidation of the powder becomes significant and increases rapidly as the temperature of the bed is raised.

Above 700° C., however, the high zinc vapor pressure causes reaction of the gaseous zinc with the oxygen at the surface of the grains. A white powder accumulates and this change in the oxidation mechanism causes a decrease in concentration from the core of the alloy particles.

This phenomenon is more likely if the oxidation is at the primitive stage and at higher temperatures. The layer of oxide covering the alloy particles is still too thin and cannot prevent the escape of zinc vapor at its surface. As the treatment proceeds the protective oxide layer thickens and prevents any change in the oxidation mechanism. This produces grains made up of a mixture of oxides of the constituent elements of the alloy. The temperature can be increased, however, if the particles are partially oxidized. This operation can be effected using a programmer, for example.

In another embodiment the fluidized bed may be of the mobile type.

As oxidation proceeds the fine particles are displaced in the bed so that the totally converted powder is obtained continuously at the bed outlet.

This may be achieved, for example, using a conveyor belt having a cushion of reactive gas or a tube inside which the flow of gas displaces the particles and produces the chemical reaction. The temperature of the bed may remain constant but it is equally possible to apply a positive temperature gradient as the particles are displaced. Using air to oxidize a zinc-based alloy, for example, the temperature at the bed inlet may be set at 400° C. from which it increases continuously to 900° C. at the device outlet. The application of this temperature gradient results in dynamic oxidation of the alloy yielding an overall rate of reaction much higher than if the temperature remains constant within the bed. The powder which oxidizes reaches high temperatures enabling the initial reactions between the oxides present to take place, for example in the case of manufacturing a ceramic. The pyrochlore phase obtained at the end of the oxidation treatment reduces the duration of subsequent heat treatment needed to produce a ceramic.

Figure 3:
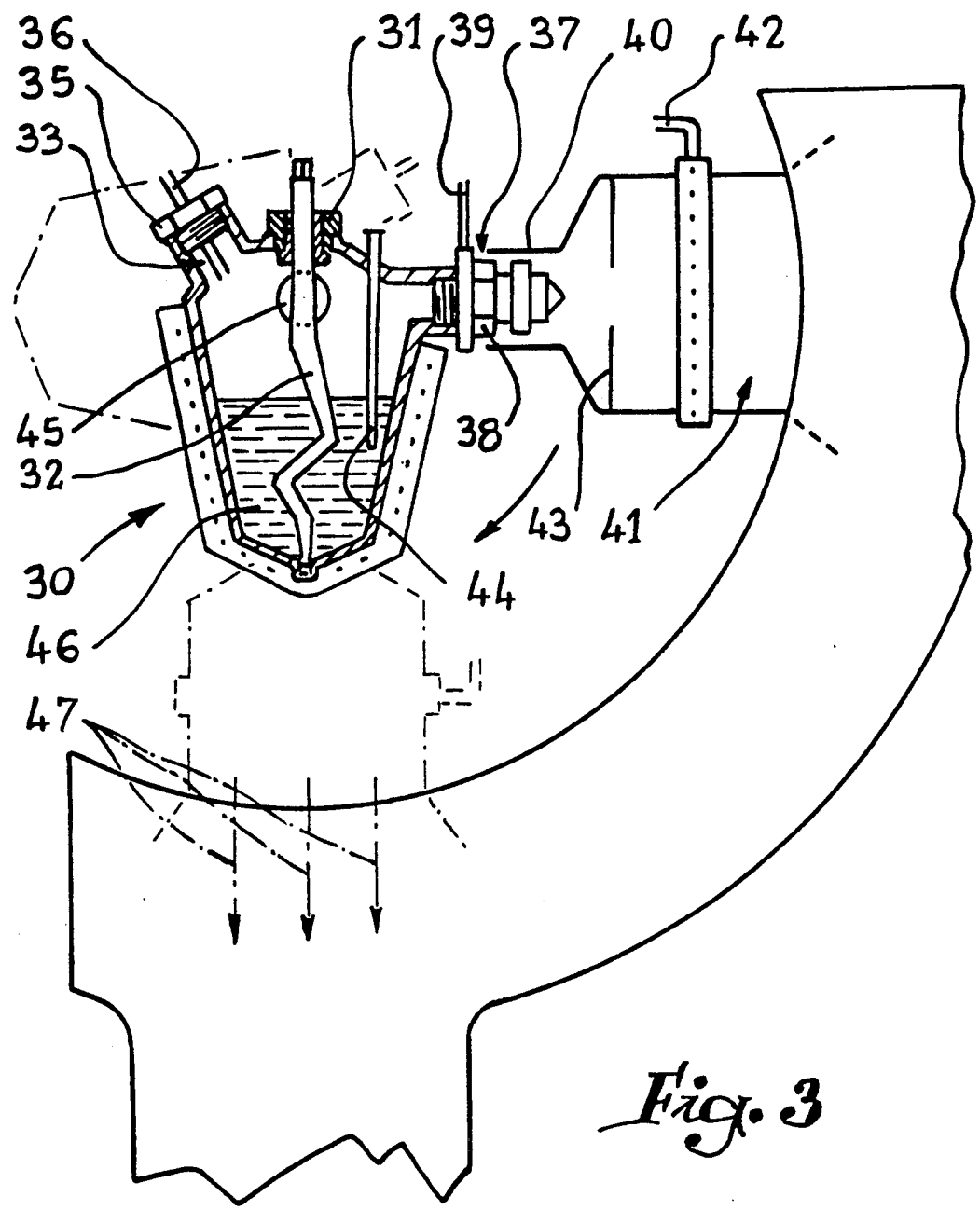
FIG. 3 is a view in cross-section of a pilot stage manufacturing device producing oxide grains by a second embodiment of a method in accordance with the invention.

FIGS. 3 and 4 show one possible coupling mode. The method may be applied to any type of metal or alloy that can be oxidized.

The apparatus shown in FIG. 3 comprises a cylindrical furnace 30 whose upper opening is hermetically sealed by a first closure member 31 associated with a stirrer 32.

The furnace 30 has an oblique lateral opening 33 for charging it; this opening is hermetically sealed by a second closure member 35 through which passes a tube 36 whose inlet end is connected to a storage tank of nitrogen (not shown). The furnace also comprises a horizontal opening 37 for discharging it. This opening is hermetically sealed by a third closure member 38 fitted with a propellant gas nozzle 39. The closure member 38 is screwed into a sprayer nozzle 40 which discharges into the chamber 41 into which pressurized water nozzles 42 discharge; a protective metal diaphragm 43 is also provided.

A thermo-electric sensor 44 is mounted inside the furnace 30.

The furnace 30 may be tilted about the axis 35 into the positions shown in full line and in chain-dotted line as will be explained later.

The method is as follows:

In the position shown in full line in FIG. 3 the metal constituents (Zn, Bi, Sb, and the like) in the form of granular powder are introduced through the orifice 33. Nitrogen is introduced through the tube 36 to flow across the mixture at a relatively low flowrate (30 ml/min, for example).

The furnace 30 is then operated. The temperature of the bath is monitored by the sensor 44 and the stirrer 32 homogenizes the molten alloy 46.

The alloy is then sprayed as follows:

The propellant gas, which may be compressed air heated to 600° C., is fed through the nozzle 39; water is fed through the nozzles 42 to produce a mist.

After checking the temperature and the fluid flowrates, the sprayer is tilted clockwise into the position shown in chain-dotted line. The alloy powder 47 obtained is recovered after separation from the cooling fluid, which is water in this example.

The alloy powder is then oxidized in a static aerated fluidized bed reactor such as that shown in FIG. 4.

The reactor 50 comprises a chamber 51 hermetically sealed at the top by a plug 52 for charging it. Its lower end has a frustoconical part connected through a heat exchanger 53 to a programmable variable flowrate air turbine 54. An outlet 55 is also provided.

The chamber 51 is surrounded with thermal insulation 56 and is fitted with a thermo-electric sensor 57.

Another thermo-electric sensor 58 is placed in the heat exchanger 53.

A powdered oxide outlet 55 is also provided.

The metal powder 47 is loaded through the orifice 52; the turbine 54 is started up and its flowrate adjusted to maintain the powder in suspension in the reactor. The reaction temperature may be as high as 600° C.; it is controlled by means of the sensor 57 and the sensor 58 in the heat exchanger 53.

The temperature may be between 400° and 700° C., as previously mentioned. It is also possible to program the temperature once the oxidation treatment has reached an advanced stage. To prevent any variation in the oxidation mechanism the rate of temperature increase must not be too great, however.

The operating conditions (gas flowrate, temperature) are programmed and maintained for a time sufficient to oxidize all of the charge.

On completion of the reaction the flowrate of the turbine 54 is changed automatically to expel the powdered oxide from the reactor.

Whatever type of fluidized bed is employed, it is the chemical composition of the fluidizing gas which determines the nature of the powder obtained. This was seen previously in the specific case of a zinc-based alloy which in contact with a flow of hot air produces mixtures of zinc oxides and other oxides of constituent elements of the alloy. Other types of alloy or pure metals such as aluminum, for example, may be used as the raw material.

The composition of the hot air may be modified; the gas may be enriched with oxygen, for example, with a $CO/CO_2$ mixture or with any other additive product in order to increase the rate of oxidation of the alloy constituents, such as steam, chlorine or any other reactive product, for example. The hot air may be replaced with another fluidizing gas such as oxygen or ozone.

It may instead be replaced with a neutral gas such as argon or nitrogen in order to produce alloy powders or by a different reactive gas to obtain a form derived from the metal such as nitrides, carbides or borides.

If the fluidizing gas is an oxidizing gas a method in accordance with the invention can be used to manufacture oxidized derivatives used as precursors for obtaining zinc oxide-based varistor type semiconductor ceramics.

It may instead be applied to producing superconductor products, positive or negative temperature coefficient thermistors or any other electrical or technical ceramic material using the appropriate alloys as starting materials.

The powder obtained is then compacted into pellets by cold pressing or by any other means using an organic or mineral binder such as water, for example.

The particles may instead by sintered at high temperature, in the order of 1,300° C., for one hour to densify the material in pellet form.

In a preferred application the metals placed in the furnace are at least some of the following metals: zinc, nickel, chromium, magnesium, manganese, bismuth, antimony, silicon, copper (and the like). A method in accordance with the invention may be applied to the manufacture of other products from oxidizable elements.

There is claimed:

1. A method of manufacturing doped zinc oxide semiconductors comprising the steps of:
    placing metals for forming a metallic alloy in a crucible;
    melting said metals under a neutral or reducing atmosphere while stirring the contents of said crucible so as to form a homogeneous liquid alloy;
    recovering said liquid alloy;
    forming homogenous particles from said liquid alloy;
    oxidizing said particles to form homogeneous metal oxide particles;
    compacting said metal oxide particles; and
    sintering the compacted metal oxide particles at an elevated temperature.

2. The method of claim 1, wherein the step of forming comprises atomizing said liquid alloy.

3. The method of claim 1, wherein the step of forming comprises casting said liquid alloy in an ingot mold in a neutral reducing atmosphere and producing an ingot, cooling said ingot and reducing it to a powder.

4. The method of claim 1, wherein the step of forming comprises casting said liquid alloy in an ingot mold in a neutral or reducing atmosphere and producing an ingot, melting said ingot to form a melt and atomizing said melt to produce particles of a homogenous composition.

5. The method of claim 4, wherein the step of oxidizing is conducted during atomization by contacting atomized particles with humid air.

6. The method of claim 2, wherein the step of oxidizing is conducted in a solid state of the particles at a temperature of from about 400° C. to about 900° C.

7. The method of claim 3, wherein the step of oxidizing is conducted in a solid state of the particles at a temperature of from about 400° C. to about 900° C.

8. The method of claim 5, wherein the step of oxidizing is conducted in a solid state of the particles at a temperature of from about 400° C. to about 900° C.

9. The method of claim 2, wherein atomization is conducted under a reducing or neutral gas atmosphere and the step of oxidizing is conducted in a liquid state of the particles at a temperature of from about 800° C. to about 1000° C.

10. The method of claim 4, wherein atomization is conducted under a reducing or neutral gas atmosphere and the step of oxidizing is conducted in a liquid state of the particles at a temperature of from about 800° C. to about 1000° C.

11. A method of manufacturing doped zinc oxide semiconductors comprising the steps of:

placing metals used for forming a metallic alloy in a crucible;

melting said metals under a neutral or reducing atmosphere while stirring the melt so as to form a homogeneous liquid alloy;

recovering said liquid alloy;

pouring said liquid alloy into a ingot mold in a neutral or reducing atmosphere and producing an ingot, cooling said ingot and reducing it into homogeneous particles;

oxidizing said particles to form homogeneous metal oxide particles;

compacting said metal oxide particles; and sintering the compacted metal oxide particles at an elevated temperature.

12. A method of manufacturing doped zinc oxide semiconductors comprising the steps of:

placing metals used for forming a metallic alloy in a crucible;

melting said metals under a neutral or reducing atmosphere while stirring the melt so as to form a homogeneous liquid alloy;

atomizing said liquid alloy as fine droplets using a gas atomizer;

recovering the atomized liquid alloy as solid metal particles in a lower portion of said gas atomizer;

oxidizing said solid metal particles in a device comprising a fluidized bed to form homogeneous metal oxide particles;

compacting said metal oxide particles; and sintering the compacted metal oxide particles at an elevated temperature.

13. A method of manufacturing doped zinc oxide semiconductors comprising the steps of:

placing metals used for forming a metallic alloy in a crucible;

melting said metals under an atmosphere selected from the group consisting of neutral atmospheres, reducing atmospheres, or air, while using a molten salt screen and stirring the melt so as to form a homogeneous liquid alloy;

atomizing said liquid alloy to form fine droplets using a gas atomizer;

recovering the atomized liquid alloy as solid metal particles in a lower portion of said gas atomizer;

oxidizing said solid metal particles in a fluidized bed to form homogeneous metal oxide particles;

compacting said metal oxide particles; and sintering the compacted metal oxide particles at an elevated temperature.

14. The method of claim 12 wherein said fluidized bed contains an oxidizing fluidizing gas of air or oxygen at a temperature of from about 400° C. to about 900° C.

15. The method of claim 13, wherein said fluidized bed contains an oxidizing fluidizing gas of air or oxygen at a temperature of from about 400° C. to about 900° C.

16. The method of claim 12, wherein said fluidized bed is a static fluidized bed.

17. The method of claim 13, wherein said fluidized bed is a static fluidized bed.

18. The method of claim 12, wherein said fluidized bed has a temperature therein ranging from about 400° C. at an inlet to about 900° C. at an outlet.

19. The method of claim 13, wherein said fluidized bed has a temperature therein ranging from about 400° C. at an inlet to about 900° C. at an outlet.

20. The method of claim 14, wherein said fluidized bed has a temperature therein ranging from about 400° C. at an inlet to about 900° C. at an inlet.

21. The method of claim 15, wherein said fluidized bed has a temperature therein ranging from about 400° C. at an inlet to about 900° C. at an outlet.

22. The method of claim 16, wherein said fluidized bed has a temperature therein ranging from about 400° C. at an inlet to about 900° C. at an outlet.

23. The method of claim 19, wherein said fluidized bed has a temperature therein ranging from about 400° C. at an inlet to about 900° C. at an outlet.

* * * * *